United States Patent [19]

Markoff et al.

[11] Patent Number: 4,933,876
[45] Date of Patent: Jun. 12, 1990

[54] SYSTEM OF OPERATING AN AUTOMATIC PLOTTER

[75] Inventors: Jay Markoff, San Diego; John R. Deubert, La Jolla, both of Calif.

[73] Assignee: Vital LaserType, Inc., San Diego, Calif.

[21] Appl. No.: 291,537

[22] Filed: Dec. 28, 1988

[51] Int. Cl.⁵ .............................................. G06F 15/00
[52] U.S. Cl. ................................. 364/520; 346/139 R
[58] Field of Search ............................. 364/518, 523; 346/140 R, 155, 139 R, 1.1, 154

[56] References Cited

U.S. PATENT DOCUMENTS

| | | | |
|---|---|---|---|
| 3,909,831 | 9/1975 | Marchio et al. | 346/140 R |
| 4,282,536 | 8/1987 | Paschen et al. | 346/140 R |
| 4,591,999 | 5/1986 | Logan | 364/523 |
| 4,763,279 | 8/1988 | Kellam et al. | 364/518 |
| 4,799,172 | 1/1989 | Wood et al. | 364/518 |

*Primary Examiner*—Arthur G. Evans
*Attorney, Agent, or Firm*—Nydegger & Harshman

[57] ABSTRACT

A system and method of operating an automatic plotter device having marking instruments for drawing images onto a large sheet with the aid of a computer includes providing the computer with data defining the desired images, providing the plotter with a preselected plurality of marking instruments each having a specified stroke width, providing the computer with data corresponding to and representing the stroke width for each of the preselected plurality of marking instruments, calculating in the computer for each marking instrument the coordinates upon which each instrument is to draw onto the sheet based upon the size, shape, and location of the image and the appropriate width, and generating control signals to the plotter for controllably selecting and causing each marking instrument to draw on the sheet at locations according to the calculated stroke coordinates. The sheet may be paper, vellum or other clear plastic utilized for the screen exposure preparation process for purposes of screen printing. The marking instrument is preferably a felt tip pen containing opaque ink. The different size pen tips may be cylindrical and flat.

7 Claims, 3 Drawing Sheets

SYSTEM OF OPERATING AN AUTOMATIC PLOTTER

BACKGROUND OF THE INVENTION

This invention relates generally to a system of operating an automatic plotting device having different marking instruments of drawing characters and images onto a sheet. Specifically, this invention relates to a system of operating an automatic plotter which utilizes different size marking instruments which are appropriately selected, with the aid of a computer, for quickly filling in images drawn on a large sheet. This invention is particularly, though not exclusively, useful in making positives for use in screen printing, and posters.

DISCUSSION OF THE PRIOR ART

Automatic plotting devices which are controlled by a computer well known and use different color drawing or marking instruments, such as pens, to draw images on sheets of paper or other materials. Typically, the plotter pen moves in crosswise direction across the sheet as the sheet is moved lengthwise on the plotter base, such as on a roller-type base, or on a flat bed table. The plotter pen and base move relative to one another as controlled by a computer to draw on and fill in the sheet at desired locations.

If the sheet material is clear plastic, such as vellum, or other suitable material, the plotter can be used to create a positive for use in the screen exposure preparation process for purposes of screen printing. If opaque fluid is used in the pen to draw and fill in images on the vellum sheet, the sheet can be used as a positive to expose a final image onto a screen printing frame. When the positive is placed on the screen and exposed to light, the opaque image on the positive blocks out light to prevent a chemical reaction on the treated screen so that the areas which are not exposed to light allow ink to pass through. Conversely, the areas which are exposed to light become hardend to prevent ink from passing through the screen. Thus, ink pushed through the screen passes through to the final substrate (material to be printed upon) to create the desired image on the final product, such as on t-shirts, sign materials, labels, posters, ect.

In the past, automatic plotting devices have been used to draw opaque images on sheets to create a positive for use in screen printing. They also have used to draw directly onto paper. Conventional automatic plotters are also able to select and change pens of different colors. Unfortunately, such plotting devices take an inordinate amount of time to fill in the characters, images and designs on the sheet. This is especially true for larger sheets, e.g. thirty-six (36) to seventy-two (72) inch wide sheets which, depending on their length, take unacceptably large amounts of time to fill in the image. Normally, first drawn is the outline of the images, such as characters or shapes to be displayed, using a thin tipped pen. Then, the plotter proceeds to fill in the images, one line at a time utilizing the same thin tipped pen as that used to draw the outlines. It does not change pen sizes. This takes an extremely long period of time, and is costly so as to inhibit use of automatic plotters to generate filled in images on larger sheets.

In light of the above, the present invention recognizes the need to utilize computerized type and graphics technology in conjunction with automatic plotting devices to be able to draw and fill in images onto a large sheet in a much shorter period of time and with minimal amount of strokes. Further, the present invention recognizes a need for such a system which will be relatively inexpensive to manufacture and operate and not require extensive redesign of exsiting conventional plotting equipment and conventional computerized operating system technology.

Accordingly, it is an object of the present invention to provide a system of operating an automatic plotting device for drawing and filling in images onto a sheet in a relatively short period of time with a minimal amount of strokes. It is another object of the present invention to provide a system of operating an automatic plotting device which is easily manufactured, cost effective, and convenient to use.

SUMMARY OF THE INVENTION

A preferred embodiment of the system of operating an automatic plotter having a plurality of marking instruments for drawing images onto a sheet, with the aid of a computer, comprises providing the computer with data defining a final size desired display including coordinates defining a set of images, providing the plotter with a preselected plurality of different size marking instruments each having a specified stroke width, providing the computer with data representing and corresponding to the plurality of different size marking instruments and stroke width for each, calculating in the computer for each different size marking instrument the coordinates of strokes defining areas on the sheet which are to be filled in by each marking instrument, and generating control signals to the plotter device for controllably selecting and causing each different size marking instrument to fill in areas on the sheet at locations according to the calculated stroke coordinates with a minimum of strokes. The system utilizes a computer program which, based on the display image to be drawn, selects the proper size marking instrument to minimize the time required to draw the images. Use of opaque marking fluid on clear plastic sheets allows positives to be generated. Use of different colors can also be accommodated.

The novel features of this invention, as well as the invention itself, both as to its structure and its operation, will be best understood from the accompanying drawings, taken in conjunction with the accompanying description, in which similar reference characters refer to similar parts, and in which:

DESCRIPTION OF THE PREFFERED EMBODIMENTS

Figure 1:
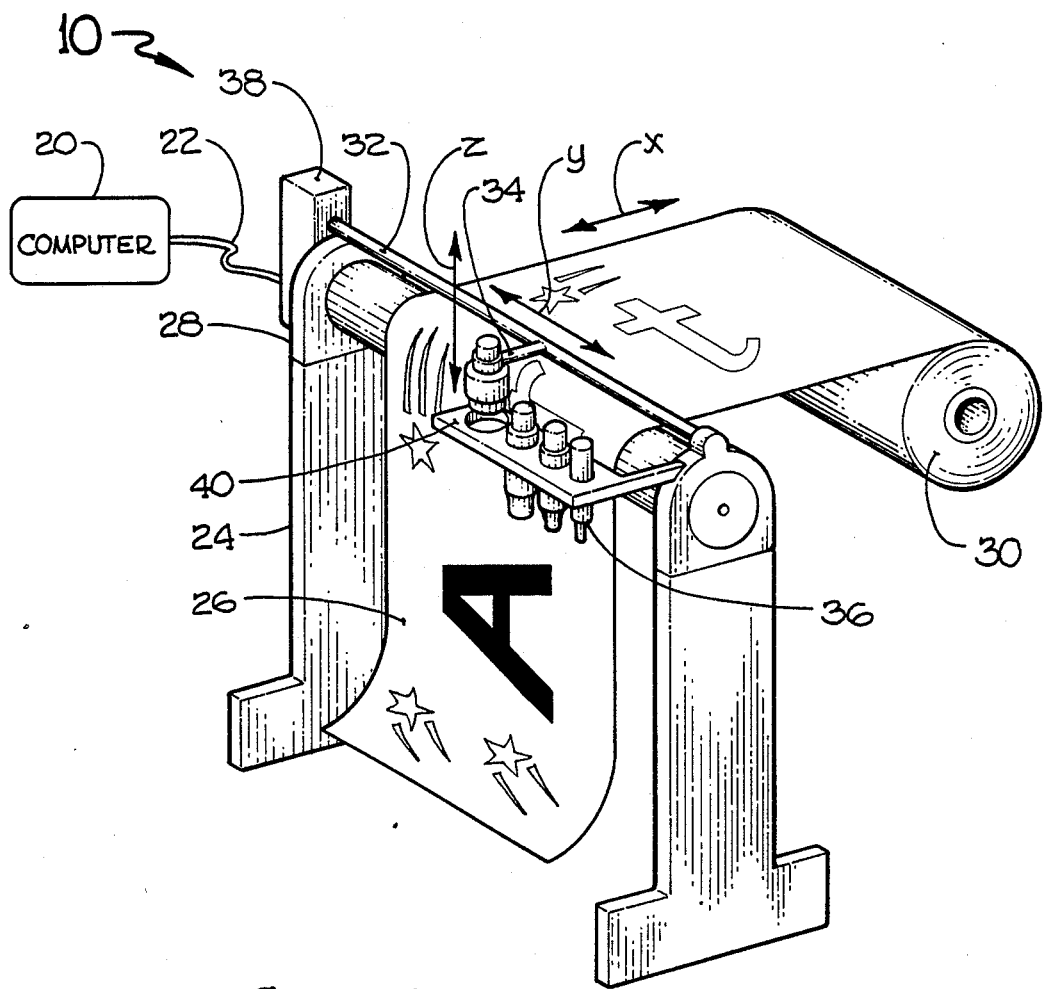
FIG. 1 is a perspective view of an automatic plotting device incorporating one embodiment of the present invention.

Referring initially to FIG. 1 there is shown a system 10 for marking artwork. A computer 20 is coupled by connection 22 to an automatic drawing device 24 such as an automatic plotter, for drawing onto a sheet 26. The automatic plotter 24 is a conventional plotter utilizing a drawing base 28, which is shown in this embodiment containing a grit roller for lengthwise movement of the sheet. This base could alternatively include a flat bed type plotter base. The sheet 26 can be fed from a roll of sheet material 30, the control of which is associated with the action of the base 28 for moving the sheet 26 back and forth on the base 28 along the lengthwise axis indicated by the arrow "x". The sheet does not have to be fed from a roll, and could instead be cut to desired size prior to its insertion in the plotter.

Further, with respect to FIG. 1, the automatic drawing device 24 includes a carriage 32 having a marking instrument holder 34 for holding one of the marking instruments 36 which are of different sizes as will be further described below. Marking instruments 36 are removably mounted in a rack 38 which is positioned to cooperate with the carriage 32 and holder 34 which can selectively grasp whichever marking instrument 36 is required to be utilized. The holder 34 and carriage 32 move in the crosswise direction indicated generally by the arrow "y". The holder 34 can pick up a different size marking instrument 36 and raise and lower the marking instrument 36 in the vertical direction as indicated generally by arrow "z", as instructed by the computer 20. Servomechanism 38 controls the action of the carriage 32 and holder 34 in conjunction with the action of the base 28 which may be connected with the action of the roller 30 to move the sheet 26 to specified locations.

Figure 2:
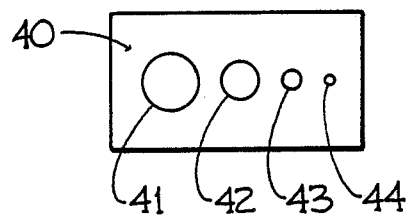
FIG. 2 is a schematic representaion of different size tips for different size marking instruments for use in conjunction with the present invention.
Figure 3:
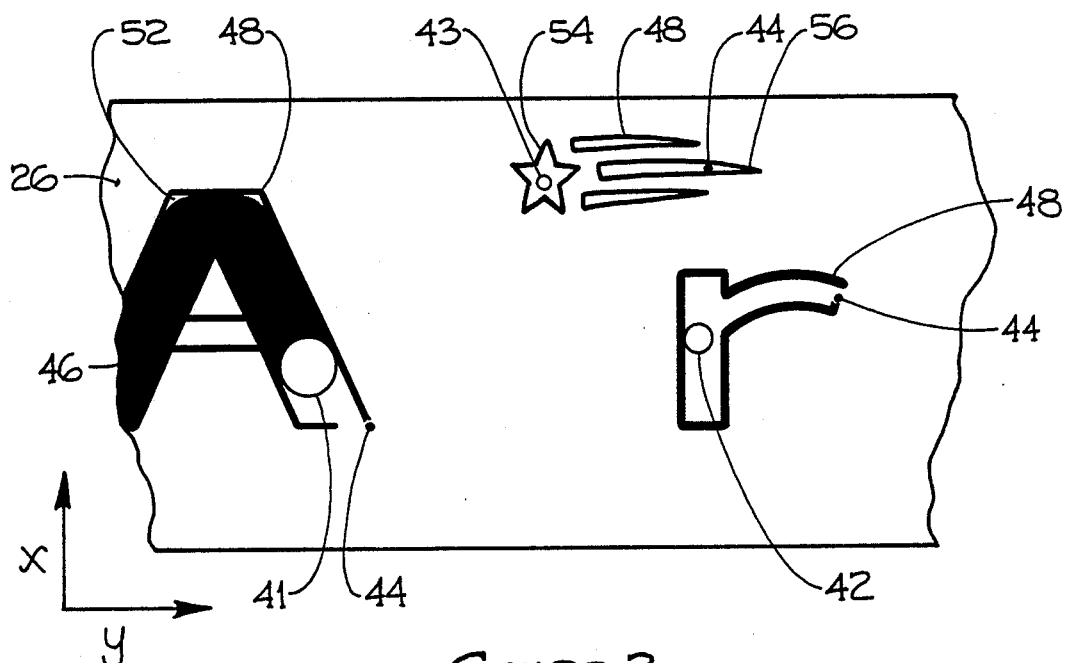
FIG. 3 is a schematic illustration showing a method of drawing and filling in images on a sheet in accordance with the present invention.

Referring now to FIGS. 2 and 3, there is shown a representation of the sheet upon which the present system has operated to draw and/or fill in various images and characters onto sheet 26. In particular, in FIG. 2, there is shown a representation 40 of different size marking tips 41, 42, 43, 44 of marking instruments 36. The marking instrument 36 may be a marker (pen) or other member for placing a stroke of specified size and width onto sheet 26 as instructed by the operation of the present invention. The marking instrument 36 may preferably be a felt tip pen having a uniform standard size diameter shaft so as to fit in conventional plotter equipment, with each marker 36 having different size marking tips 41, 42, 43, 44, defining strokes of various desired widths. The tip of the pen is preferably a flat circular shape. The fluid utilized is one appropriate for the particular application. For example, if the system is being used to create a positive, the fluid utilized within the marking pen can be any fluid of intrinsic opacity, such as red ink, india ink, or any other conventionally known opaquing fluid. If the system is being used to create a large poster, rather than a positive, then different color fluids can be utilized in conjunction with different size tips.

As shown in FIG. 3, after the characters or images on sheet 26 are outlined, they are filled in by marking 46 on the sheet for each image. The sheet 26 is a material appropriate for the particular use. For example, for purposes of filling in a positive to be used for screen printing, typically a clear plastic, such as vellum would be appropriate. If a large poster, then paper might suffice. The width of the sheet for standard plotting devices can be up to seventy-two (72) inches. Larger devices could be utilized for larger sheets and realize the benefits of the present invention provided the different size marking tips chosen for the marking instruments 36 are in number and of appropriate diameters as may be needed for the particular application.

As further shown in FIG. 3, marking tip size 41 is utilized to make wide strokes onto the character "A". The smallest selected marking size tip 44 can be utilized to make an outline 48 for each character to give it a sharp crisp edge. Then, the larger size tip marking instruments can be utilized to fill in the characters and images as required. For example, as shown in FIG. 3, the large size tip 41 is utilized to make the broad stroke, leaving area 52 in corners of the "A" to be filled in by smaller size tips as required. There is also shown in FIG. 3 as an illustration of the concept that a marking instrument having smaller size tip 42 could be utilized to make the smaller letter "r". Again, smallest size tip 44 can be used to efficaciously draw in the fine elements. This is also true with respect to designs which may be created such as the star 54 and tails 56 shown in FIG. 3.

OPERATION

The computer 20 determines which areas of the design should be filled in with which sized marking pen 36 as explained below. Obviously, larger size marking instrument tips would not be acceptable in all areas to be filled in.

Figure 4:
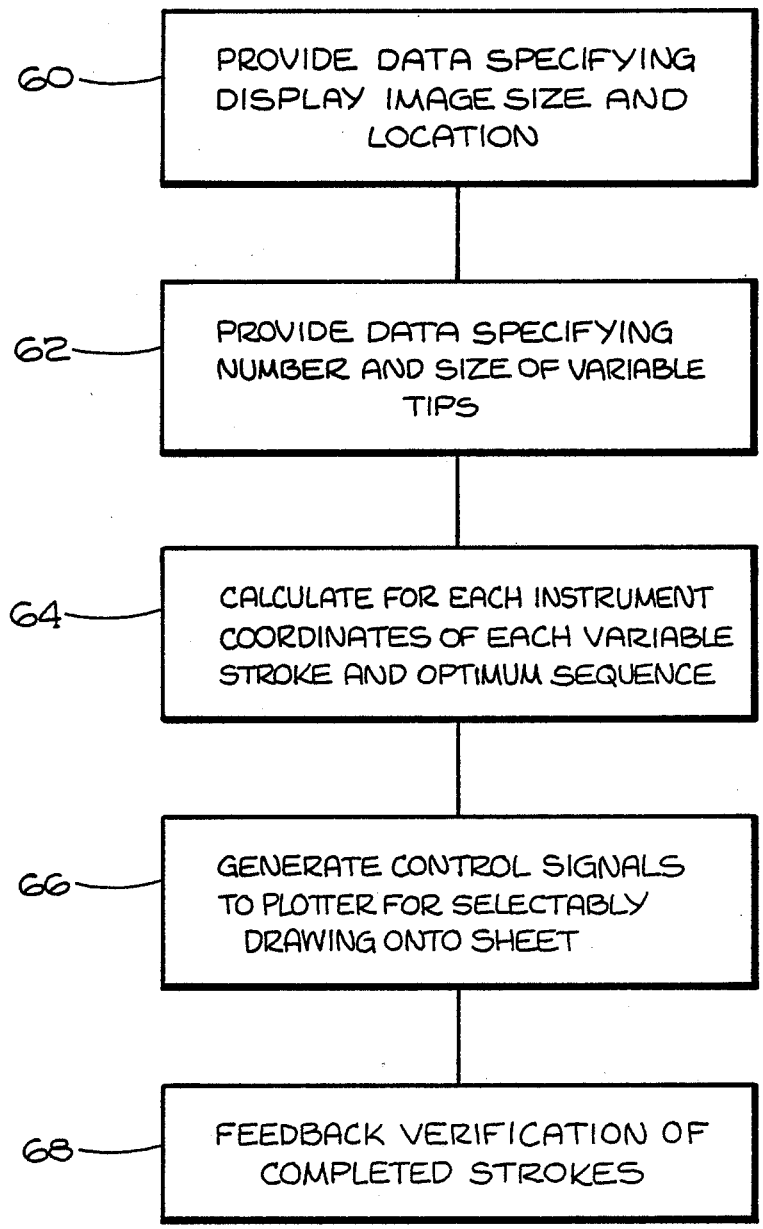
FIG. 4 is a schematic diagram of the process of one embodiment of the present invention.

Referring now to FIG. 4, there is shown a schematic flow diagram of the operation of the method with the use of a computer 20 for controlling the operation in accordance with the present invention. In particular, the computer 20 is provided 60 with data defining a final size desired image display, such as the display images shown in FIG. 1, which data includes coordinates specifying the desired finished images, and their locations on the sheet 26. The computer is also provided 62 with data representing and corresponding to a preselected presentation 40 specifying the number and the different sizes of the tips for the marking instruments 36 to be utilized. Colors may also be indicated if appropriate. A plurality of sets of different size marking pens could also be utilized, where each set was comprised of a given color.

Based on the data specifying the display images, and the different size marking instrument parameters mentioned above, the computer calculates 64 for each marking instrument 36 the coordinates of strokes defining areas on the sheet 26 contained within the boundaries of the coordinates specifying the desired images. These stroke coordinates define the areas upon the sheet 26 upon which each marking instrument 36 is to place its particular size stroke. The calculations include x,y coordinates on the sheet 26, as well as when the marking instruments 36 should be raised and lowered in the z direction for marking onto the sheet as shown in FIG. 1. Based on the size of the images to be drawn on the sheet 26, and the sizes chosen for each variable size tip, the computer 20 generates control signals to select the appropriate marking instrument 36 having different size tips to mark on the sheet 26 in the proper sequence at proper locations in order to minimize the amount of time required to fill in all of the images to be drawn onto sheet 26. In one embodiment, the small size tip 44 of a particular marking instrument 36 can be utilized to draw the outline for each character image, and then the appropriate size larger tip 41 of a particular marking instrument 36 can be utilized to fill in each character wherever its size permits. Likewise, the next appropriate size marking instrument 36 can then be utilized. Depending on the plotting equipment used, the strokes may move generally in the x-direction and the y-direction for each different size marking instrument 36 so that all strokes for a given pen are utilized before the next pen is selected. The largest available variable size tip would be utilized to fill or draw in the most amount of area which that particular size tip could fill in within each character. The computer generates (66) control signals to the drawing device for controllably selecting and causing each of the marking instruments 36, each having a preselected variable size tip, to draw on sheet 26 at the locations according to such calculated strokes coordinates.

There can be included feedback 68 to verify that strokes have been completed as instructed by the control signals. Also included are subroutines for optimization of the sequence to minimize the amount of time to complete a given display being drawn onto sheet 26.

Utilizing a computer 20 to calculate and select appropriate size marking instrument tips to be used to fill in large areas of sheet 26 with relatively fewer strokes allows the large sheet to be completed and ready for production in far much less time, not heretofore available in the prior art. Use of the different size marking instruments, along with the computer software for controlling same, allows the present invention to be utilized with conventional plotting equipment effectively and with little added expense, since most plotters utilize a computer controlled servomechanism for plotting data. Utilizing the plotter at a much higher productive rate for the purpose of creating filled in type and graphics in the fast and efficacious manner hereby presented allows large sheet images to be produced in a much shorter time, thereby making such production in a cost effective manner for producing large images on sheets at speeds not otherwise realized by the prior art systems and methods.

While the particular system of operating an automatic plotting device for drawing onto sheets as herein shown and disclosed in detail is fully capable of obtaining the objects and providing the advantages herein before stated, it is to be understood that it is merely illustrative of the presently preferred embodiments of the invention and that no limitations are intended to the details of construction or design herein shown other than as defined in the appended claims.

We claim:

1. A system of operating an automatic plotter device having drawing instruments for filling in images onto a sheet with the aid of a computer, comprising:
   means for providing said computer with data defining desired images including coordinates specifying a desired image size, shape, and location on said sheet;
   means for providing said plotter device with a preselected plurality of different size marking instruments each having a specified size drawing tip having a specified stroke width;
   means for providing said computer with data cooresponding to and representing said preselected plurality of different size marking instruments;
   means for calculating in said computer for each said different size marking instrument having a specified stroke width, based upon the size, shape, and location of said desired image, coordinates defining strokes of each said different size marking instrument for filling in appropriate areas of said sheet; and
   means for generating control signals for said computer to said plotter device for controllably selecting and causing each said marking instrument to fill in said images onto said sheet at said areas according to said calculated stroke coordinates.

2. A system of operating an automatic plotter device as recited in claim 1, wherein said sheet is vellum.

3. A system of operating an automatic plotter device as recited in claim 2, wherein said marking instruments comprise felt tip pens containing opaque ink.

4. A system of operating an automatic plotter device as recited in claim 3, wherein said marking instruments each have a tip which is generally cylindrical with a generally flat suface.

5. A system of operating an automatic plotter device as recited in claim 3, wherein the outer housing shaft sizes of said pens are of the same size, and the tips are of differing sizes.

6. A system of operating an automatic plotter device as recited in claim 3, wherein said sheet is paper, and said plurality of different size marking instruments include sets of different colors.

7. A method of operating an automatic plotter device having drawing instruments for filling in images onto a sheet with the aid of a computer, comprising:
   providing said computer with data defining desired images including coordinates specifying a desired image size, shape, and location on said sheet;
   providing said plotter device with a preselected plurality of different size marking instruments each having a specified size drawing tip having a specified stroke width;
   providing said computer with data corresponding to and representing said preselected plurality of different size marking instruments;
   calculating in said computer for each said different size marking instrument having a specified stroke width, based upon the size, shape, and location of said desired image, coordinates defining strokes of each said different size marking instrument for filling in appropriate areas of said sheet; and
   generating control signals for said computer to said plotter device for controllably selecting and causing each said marking instrument to fill in said images onto said sheet at said areas according to said calculated stroke coordinates.

* * * * *